(12) United States Patent
McCarthy et al.

(10) Patent No.: US 8,885,801 B2
(45) Date of Patent: Nov. 11, 2014

(54) METHOD AND APPARATUS FOR PROVIDING VIRTUAL MESSAGING

(75) Inventors: Michael McCarthy, Little Silver, NJ (US); Robert McCarthy, Marlborough, MA (US); David Ittner, Manalapan, NJ (US); Saul Einbinder, Holmdel, NJ (US); Howard Frisch, Westfield, NJ (US)

(73) Assignee: Genband US LLC, Frisco, TX (US)

( * ) Notice: Subject to any disclaimer, the term of this patent is extended or adjusted under 35 U.S.C. 154(b) by 1012 days.

(21) Appl. No.: 12/910,421

(22) Filed: Oct. 22, 2010

(65) Prior Publication Data

US 2011/0200180 A1 Aug. 18, 2011

Related U.S. Application Data

(60) Provisional application No. 61/338,323, filed on Feb. 17, 2010.

(51) Int. Cl.
*H04M 1/64* (2006.01)
*H04M 1/725* (2006.01)
*H04M 3/537* (2006.01)
*H04M 3/533* (2006.01)

(52) U.S. Cl.
CPC ............ *H04M 3/533* (2013.01); *H04M 3/537* (2013.01); *H04M 2203/4536* (2013.01)
USPC ..................... 379/88.25; 455/412.1

(58) Field of Classification Search
USPC ............ 379/88.11–88.25, 211.02; 455/412.2, 455/413
See application file for complete search history.

(56) References Cited

U.S. PATENT DOCUMENTS

| | | | |
|---|---|---|---|
| 6,144,667 A | 11/2000 | Doshi et al. | |
| 6,553,113 B1 | 4/2003 | Dhir et al. | |
| 6,650,739 B1 * | 11/2003 | Doeberl et al. | 379/88.18 |
| 6,868,333 B2 | 3/2005 | Melen | |
| 6,944,444 B1 | 9/2005 | Gillespie et al. | |
| 7,046,993 B2 | 5/2006 | Haaramo et al. | |

(Continued)

FOREIGN PATENT DOCUMENTS

EP 1 104 206 B1 8/2007
WO WO 2006/011742 A1 2/2006

OTHER PUBLICATIONS

International Search Report and Written Opinion mailed Oct. 26, 2011 for PCT Application No. PCT/US2011/025156.

(Continued)

*Primary Examiner* — Mohammad Islam
(74) *Attorney, Agent, or Firm* — Moser Taboada

(57) ABSTRACT

A method and apparatus of providing virtual messaging is provided. The method comprises examining status information associated with a plurality of servers for notifying call recipients of messages using at least one messaging protocol, wherein each of the plurality of servers operates independently, identifying an available server of the plurality of servers, based on the status information, for handling a message and directing an incoming call to the available server, wherein the available server stores the message until communication of the message to at least one call recipient, wherein the available server communicates at least one notification message associated with the message to at least one telephone number of the at least one call recipient, wherein the at least one notification message comprises a telephone number associated with the call origination device and a message link number for communicating with the available server.

20 Claims, 8 Drawing Sheets

(56) References Cited

U.S. PATENT DOCUMENTS

| | | |
|---|---|---|
| 7,113,799 B2 | 9/2006 | Ahmad et al. |
| 7,197,122 B2 | 3/2007 | Viori |
| 7,272,400 B1 | 9/2007 | Othmer |
| 7,315,737 B2 | 1/2008 | Duerk et al. |
| 7,493,381 B2 | 2/2009 | Garg |
| 7,653,193 B2 | 1/2010 | Pfleging et al. |
| 7,664,239 B2 | 2/2010 | Groff et al. |
| 8,155,299 B2 * | 4/2012 | Koch et al. ............... 379/211.02 |
| 8,509,745 B2 * | 8/2013 | Sigmund et al. .............. 455/413 |
| 2003/0123622 A1 * | 7/2003 | Gifford et al. ............. 379/88.13 |
| 2005/0064883 A1 * | 3/2005 | Heck et al. .................... 455/466 |
| 2006/0020686 A1 * | 1/2006 | Liss et al. ..................... 709/219 |
| 2008/0051067 A1 | 2/2008 | Kwon et al. |
| 2009/0041213 A1 | 2/2009 | Kwon et al. |
| 2009/0325544 A1 | 12/2009 | Deutsch et al. |
| 2009/0328054 A1 * | 12/2009 | Paramasivam et al. ........ 718/105 |
| 2010/0159889 A1 * | 6/2010 | Sigmund et al. .............. 455/413 |
| 2011/0092190 A1 * | 4/2011 | Vander Veen et al. ..... 455/412.2 |
| 2013/0041953 A1 * | 2/2013 | Renner et al. ................. 709/204 |

OTHER PUBLICATIONS

"Mobile-Agent-Based Collaborative Signal and Information Processing in Sensor Networks", Hairong Qi, Yingyue Xu and Xiaoling Wang, Proceedings of the IEEE, vol. 91, No. 8, Aug. 2003, pp. 1172-1183.

* cited by examiner

METHOD AND APPARATUS FOR PROVIDING VIRTUAL MESSAGING

CROSS-REFERENCE TO RELATED APPLICATIONS

This application claims priority to U.S. Provisional Patent Application Ser. No. 61/338,323, filed Feb. 17, 2010, which is incorporated by reference herein in its entirety.

BACKGROUND OF THE INVENTION

1. Field of the Invention

Embodiments of the present invention generally relate to voice messaging systems and, more particularly, to a method and apparatus for providing virtual messaging.

2. Description of the Related Art

To support a voice messaging (voice and/or video messaging) infrastructure, current messaging systems require a communications carrier that offers such a service to purchase and maintain substantial amounts of equipment. Each subscriber to the messaging service must establish a personal account in which voice messages are stored. The equipment includes a substantial number of call processing servers that support specific user accounts, store messages, retrieve messages, manage caller load, and so on. As more accounts are opened and messages stored, the number of servers and the amount of storage also must increase. The result is a cumbersome and expensive system to maintain.

Furthermore, conventional voicemail systems require subscribers to each have a designated "voice mailbox". These mailboxes have a finite size and, after being "filled", the subscriber can no longer receive voice messages and callers are told the mailbox is full. A voice mail service provider must incur substantial cost to maintain the mailboxes and a subscriber must be vigilant in either deleting voice messages or requesting (and paying for) additional mailbox storage space.

Therefore there is a need in the art for an improved voice messaging system.

SUMMARY

Embodiments of the present disclosure comprise a method of routing an incoming call to a plurality of virtual message servers. According to some embodiments of the subject invention, the method comprises processing an incoming call for at least one call recipient, examining status information associated with a plurality of servers for notifying call recipients of messages using at least one messaging protocol, wherein each of the plurality of servers operates independently, identifying an available server of the plurality of servers, based on the status information, for handling a message for the incoming call and directing the incoming call to the available server, wherein the available server stores the message until communication of the message to at least one call recipient, wherein the available server communicates at least one notification message associated with the message to at least one telephone number of the at least one call recipient, wherein the at least one notification message comprises a telephone number associated with the call origination device and a message link number for communicating with the available server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present disclosure comprise a method and apparatus for providing virtual messaging (i.e., voice and/or video messaging). In one embodiment, a virtual message server is coupled to a communications network to provide a call answering message service to one or more communications devices. When a telecommunications call is placed to a call recipient device that does not accept the call (e.g., no answer), the virtual messaging server receives the incoming call, opens a message record, records the message, and notifies the call recipient device that a message has been received. The notification protocol used may include short messaging service (SMS) messages, multimedia messaging service (MMS) messages, e-mail messages, and/or other forms of notification. In some embodiments, the virtual messaging server does not require the recipient caller to have an account, a mailbox or any other type of long term message storage, i.e., Automatic Provisioning and Purging (accountless), Individual Message Index (boxless) and storageless messaging (voice and/or video messaging).

Figure 1:
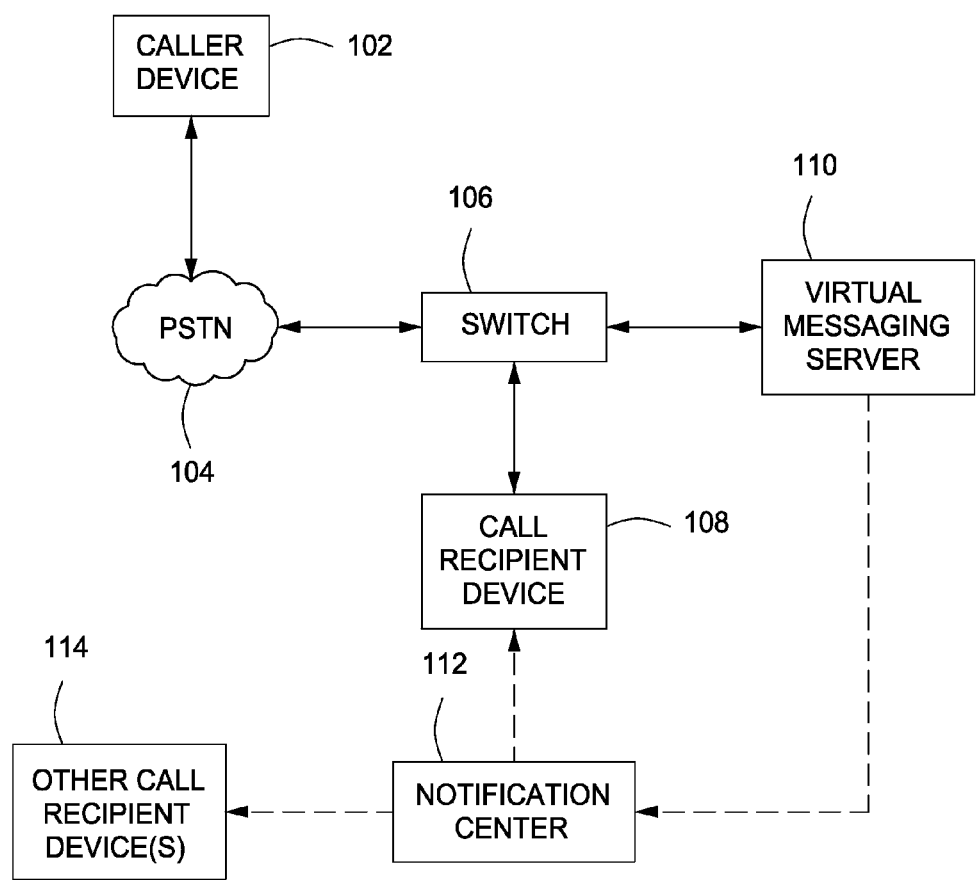
FIG. 1 depicts a functional block diagram of a virtual messaging system in accordance with one embodiment of the present invention.

FIG. 1 depicts a functional block diagram of a virtual messaging system 100 in accordance with one embodiment of the present invention. The virtual messaging system 100 may be a voice messaging system that comprises a caller device 102, a public switched telephone network (PSTN) 104, a telecommunications switch 106, a call recipient device 108, a virtual voice messaging server 110, a notification center 112, and other call recipient devices 114. The call origination 102 may be any form of telecommunications device used to initialize a voice call. Such devices 102 comprise cellular telephones, personal digital assistants, computer devices, telephone handsets, and/or the like. The PSTN 104 routes telephone calls in a conventional manner from the call origination 102 to a call recipient device 108. A telecommunications switch 106 routes a call from the PSTN 104 to the call recipient device 108. In one embodiment of the invention, the call recipient device 108 is a cellular telephone. In other embodiments of the invention, other forms of call recipient device similar to the call origination 102 can be used. The only limitation upon the call recipient device is the device must be capable of receiving a voice message notification as described below. In some embodiments, the call recipient can designate that the voice message notification be sent to another device (other call recipient devices 114) such as a computer, cellular telephone, PDA, and the like. While FIG. 1 illustrates that the incoming calls are handled via the PTSN, in other embodiments, the incoming calls are handled via IP networks or private networks. It is appreciated that any communication network may be utilized to provide virtual messaging.

When the call recipient device 108 does not accept the call from the caller device 102 (e.g., no answer), the switch 106 routes the incoming call to the virtual voice messaging server 110. Depending on the type of voice messaging service to which the incoming call recipient has subscribed, the virtual voice messaging server 110 processes the call in accordance with the subscribed service. Various embodiments of the types of service that are available are described below. Depending on the subscribed service, the virtual messaging server 110 contacts a notification center 112 to notify the call recipient device 108 and/or other call recipient devices 114 that a message has been received. In accordance with one embodiment, the call recipient may establish a profile as part of their subscribed service to enable the voice message notification to be sent in a specific format to a specific device or devices.

Figure 2:
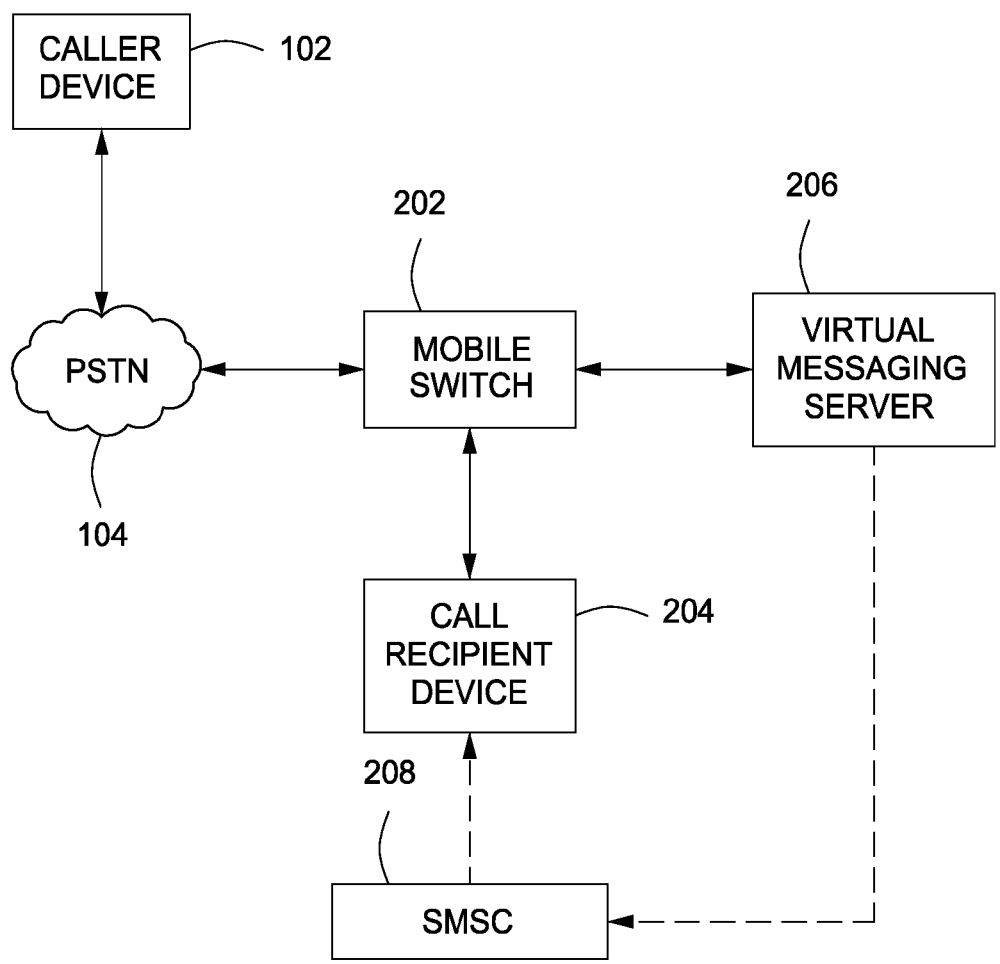
FIG. 2 depicts a functional block diagram of a virtual messaging system utilizing short messaging service (SMS) messages for providing message notification in accordance with one embodiment of the present invention.

FIG. 2 depicts a functional block diagram of a virtual messaging system 200 utilizing short messaging service (SMS) messages for providing message notification in accordance with one embodiment of the present invention.

The virtual messaging system 200 comprises a call origination 102, a PSTN 104, a mobile telephone switch 202, a call recipient device 204, a virtual messaging server 206 and an SMS Center (SMSC) 208. In this embodiment, the notification of the arrival of a message (e.g., voice and/or video messaging) is provided using the SMSC 208. As such, the call recipient device 204 must be capable of receiving an SMS message, e.g., most cellular telephones. Upon the call recipient device 204 not accepting a call from the caller device 102, the mobile switch 202 routes the call to the virtual messaging server 206.

Upon receipt of the call, the virtual messaging server 206 opens a message record, records a message (e.g., voice and/or video messages) and sends an SMS message to the call recipient device 204 via the SMSC 208 to notify the call recipient device 204 that the message has arrived. The message is not associated with the subscriber's inbox. In fact, the subscriber need not have an administered account on the virtual messaging system 200 before the call arrives. As is described in detail with reference to FIG. 6 below, the SMS message contains a message link number that is addressed to the telephone number of the call recipient device 204. The message link number is a unique telephone number associated with a specific message. Upon receipt of the SMS, as detailed with respect to FIG. 3 below, the call recipient device dials the message link number and the server 206 plays the message that is associated with a combination of the message link number and a telephone number of the call recipient device. In this manner, each message is treated as an individual entity, rather than stored in an account or associated with a specific account. Since each message is self contained, a single subscriber's messages can be handled across a multitude of independent messaging servers providing substantial flexibility in system scale. To add additional capacity for the virtual voice messaging system, additional virtual messaging servers 206 can simply be added to the system 200 to handle increased volumes of calls.

Figure 3:
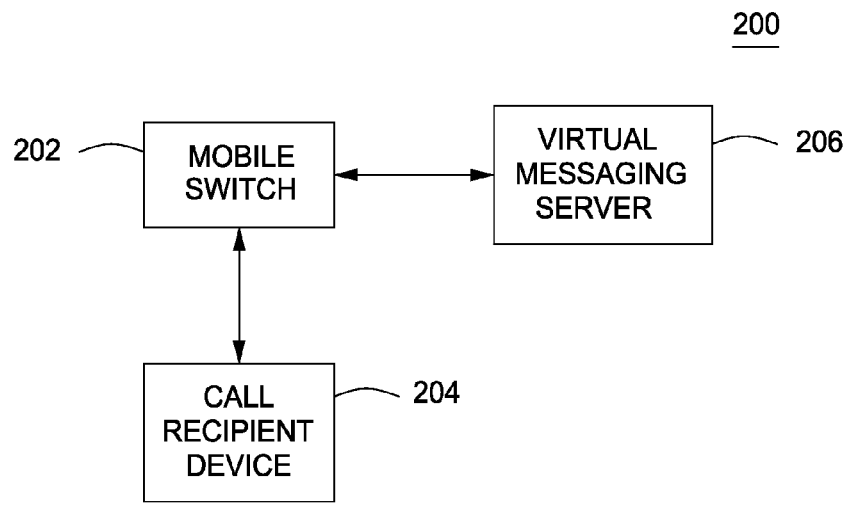
FIG. 3 depicts a functional block diagram of the system of FIG. 2 as utilized to access a message.

FIG. 3 depicts a functional block diagram of the system 200 of FIG. 2 being utilized to access a message according to various embodiments. In one embodiment, the recipient of the SMS message dials the message link number received in the SMS message. The call is routed by the mobile telephone switch 202 to the virtual messaging server 206 that originated the SMS message. Upon receipt of the call, the virtual messaging server 206 accesses the voice message record and plays the message. In one embodiment, as long as the caller does not hang up, the message will repeat. As such, the caller does not have to utilize a menu to receive and/or replay messages. The call recipient device 204 is not required to enter account number, pin number, or any other identifier. The call recipient device is simply authenticated by the use of the message link number in combination with the telephone number of the call recipient device, which form a unique identifier for the message record. If the virtual messaging server 206 is installed in a carrier's network, the carrier may verify that the message retrieval call originated within their network to provide the subscriber with additional protection from potential Caller ID Spoofing. Upon accessing the message record and having the caller terminate the call to retrieve the message, the virtual messaging server may delete the record. In some embodiments, the voice message may be stored for a period of time to permit repeated retrieval by the call recipient device. Consequently, to utilize the voice mail system, the call recipient does not need an account or a voice mailbox in which to store the message. As a result, the virtual messaging system is easier and simpler to use because the call recipient need not navigate various menus.

Figure 4:
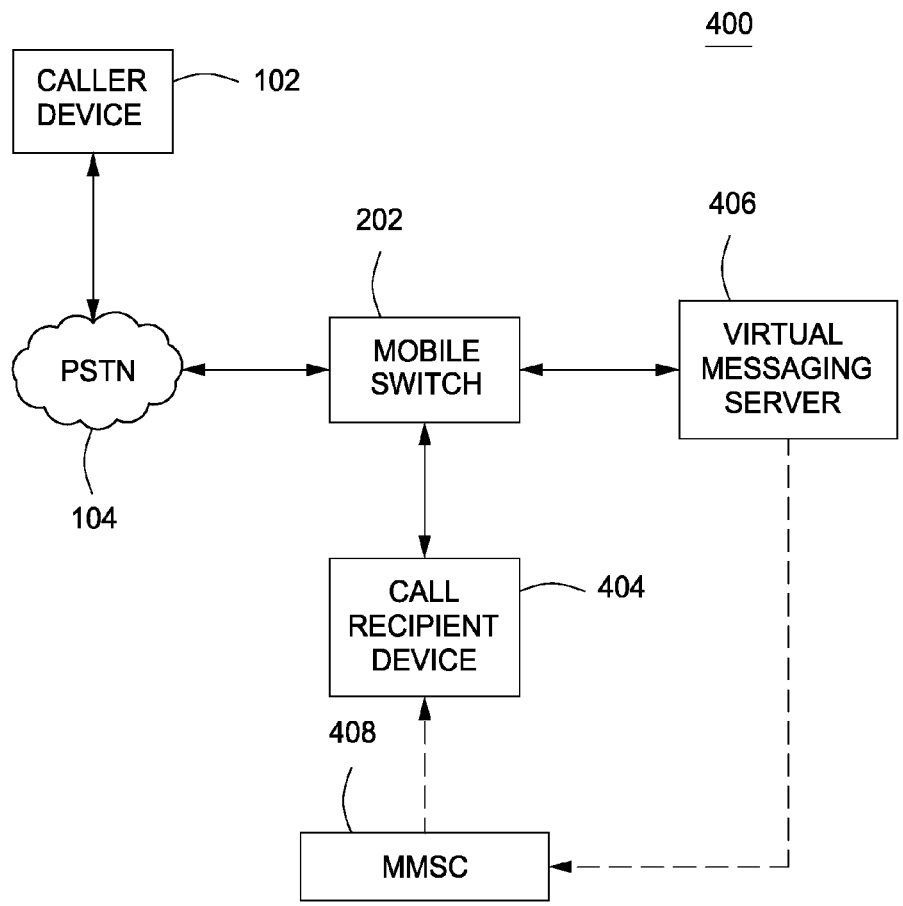
FIG. 4 depicts a functional block diagram of a virtual messaging system using utilizing multimedia messaging service (MMS) messages for providing message notification in accordance with one embodiment of the present invention.

FIG. 4 depicts a functional block diagram of a virtual messaging system 400 using utilizing MMS messages for providing message notification in accordance with one embodiment of the present invention. The virtual voice messaging system 400 comprises a caller device 102, a PSTN 104, a mobile telephone switch 202, a call recipient device 404, a virtual messaging server 406 and an MMS Center (MMSC) 408. In this embodiment, the notification of the arrival of a message is provided using the MMSC 208. As such, the call recipient device 404 must be capable of receiving an MMS message, e.g., most cellular telephones. Upon the call recipient device 404 not accepting a call from the caller device 102, the mobile switch 202 routes the call to the virtual messaging server 406. The virtual messaging server 406 opens a message record, records a message and sends a MMS message to the call recipient device 404 via the MMSC 208 to notify the call recipient device 404 that the message has arrived. As is described in detail with reference to FIG. 6 below, the MMS message contains the recorded message. Upon receipt, the call recipient device 404 plays the voice message using MMS software for receiving and playing audio and/or video content. In this manner, each message is treated as an individual entity, rather than being stored in any form.

Figure 5:
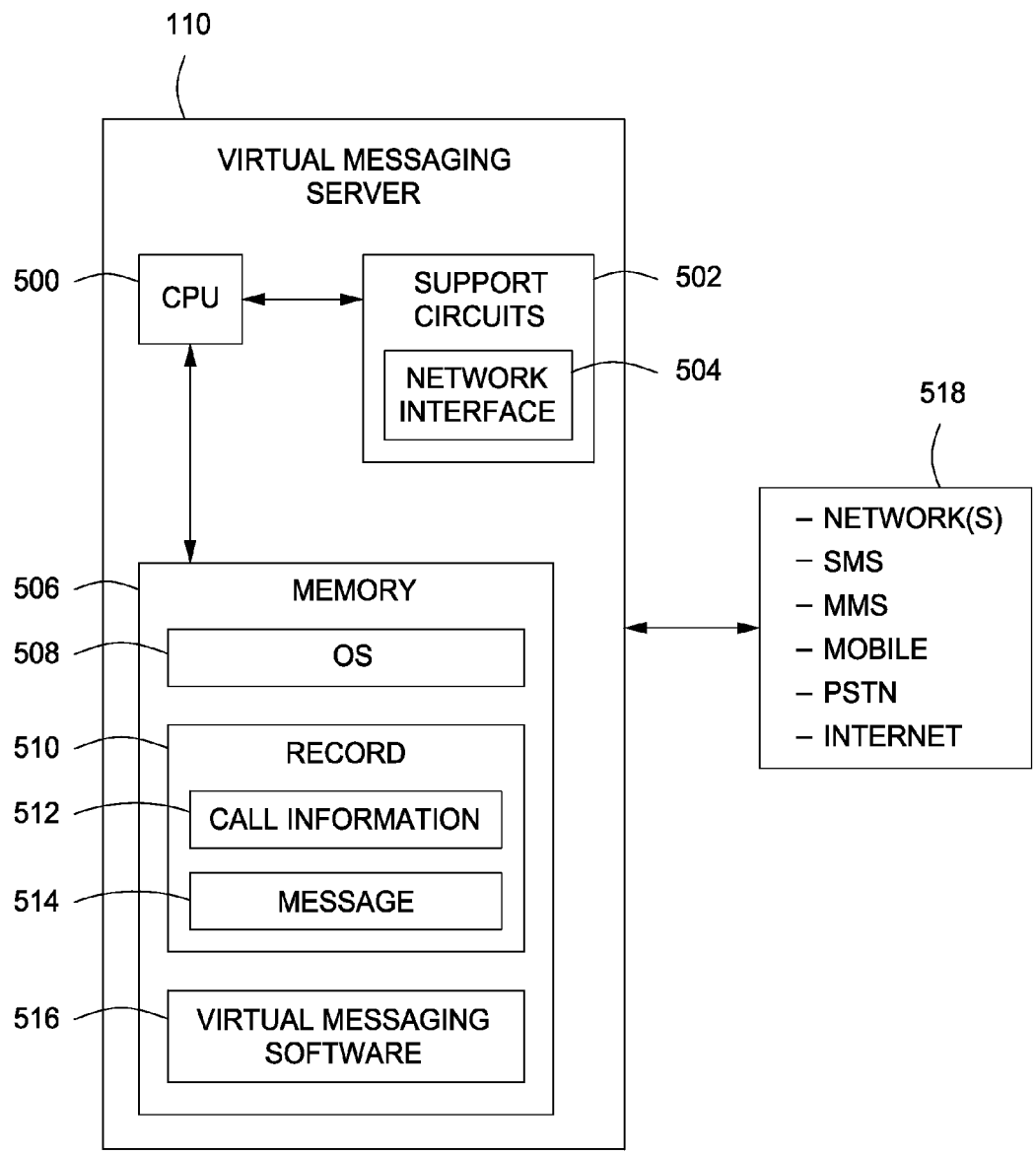
FIG. 5 depicts a simplified block diagram of a virtual messaging server utilized in the virtual messaging systems of FIGS. 2 and 4.

FIG. 5 depicts a simplified block diagram of a virtual messaging server 110 utilized in the virtual messaging systems of FIGS. 2 and 4. The server 110, which depending upon programming can operate as server 206 or server 406, comprises at least one central processing unit (CPU) 500, supports circuits 502, and memory at 506. The CPU 500 may be one or more commercially available processors (e.g., microprocessors, microcontrollers, application-specific integrated circuits, and/or the like) capable of executing software programs to perform the operations described below. These support circuits 502 comprise well-known circuitry used to facilitate the functionality of the CPU 500. Such support circuits 502 include, but are not limited to, clock circuits, cache, power supplies, buses, input/output circuitry, and/or the like. Specifically, the support circuits 502 comprise a network interface 504 for facilitating communication between the server 110 and the various networks/services 518 described herein (e.g., SMSC, MMSC, mobile switch, PSTN, Internet (e-mail) and/or the like).

The memory 506 may comprise various forms of digital storage including, but not limited to, random access memory, read-only memory, optical memory, disk drives, and/or the like. In one embodiment of the invention, the memory 506 comprises an operating system 508, a message record 510, and virtual messaging software 516. The operating system 508 may be any form of operating system that facilitates execution of the virtual messaging software 516. Such operating systems include, but are not limited to, UNIX, Microsoft Windows, Apple OS X, Linux, BSD and/or the like. The message record of 510 comprises call information 512 and the message 514, such as a voice and/or video message. The content of the call information 512 depends on the type of service used by the call recipient device. In one embodiment, the call information 512 generally comprises the telephone number of the call origination device, the telephone number of the call recipient device, and, in some embodiments of the invention, the message link number. The virtual messaging software 516 is executed by the CPU 500 to process received calls as described below with respect to FIGS. 6 and 7.

Figure 6:
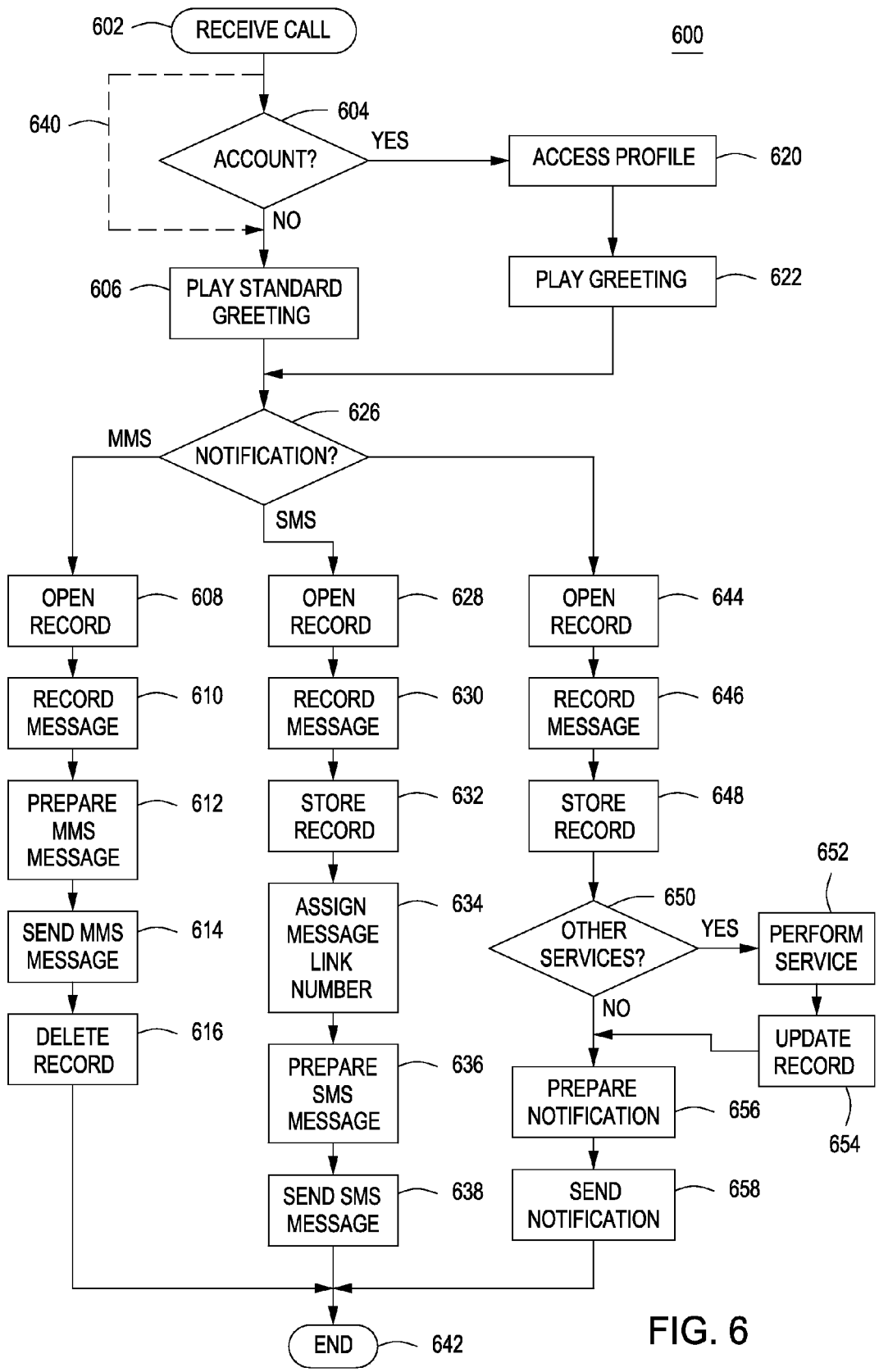
FIG. 6 depicts a flow diagram of a method of providing a virtual messaging service in accordance with one embodiment of the present invention.

FIG. 6 depicts a flow diagram of a method 600 of providing a virtual messaging service in accordance with one embodiment of the present invention. Method 600 begins at step 602 upon receipt of a call. At step 604, the method 600 queries whether the recipient of the call, as identified by their telephone number, has an account with the virtual messaging system. In some embodiments of the invention, this step is not utilized and the method 600, upon receipt of the call, proceeds directly to step 606 as indicated via path 640. In such an embodiment, the call recipient is not required to have an account such that a call for a recipient is recorded and automatically sent via either MMS message or SMS message to the call recipient device.

If at step 604, an account was established for the call recipient, the method 600 proceeds from step 604 to step 620, wherein the call recipient's profile is accessed. Within a call recipient's profile, the call recipient can establish a type of notification (e.g., MMS, SMS, e-mail and or the like), a personalized greeting, one or more devices to which notification is to be routed, and/or the like. As such, only if a recipient profile associated with an account has been established can the notification be sent to any device other than the call recipient device that originally received the call. At step 622, the method 600 plays the greeting as defined in the profile (e.g., a standard greeting or a personalized greeting). In one embodiment, the standard greeting comprises a message that requests the caller to leave a message for the called telephone number (e.g., "You have reached 555-555-1234, please leave a message"). The called phone number is identified from the incoming call information. The personalized greeting is a greeting that has been previously recorded by the call recipient.

If the system is configured not to have accounts for each subscriber (i.e., an accountless system) or the call recipient does not have an account, the method 600 plays, at step 606, the standard greeting. In such an accountless system, the incoming calls are directed to any available virtual messaging server, i.e., the call recipient device does not need to be assigned to a "home" server for handling the messages. As shown further below in the description for FIGS. 8-10, routing software within the mobile switch 202 selects an available server amongst a plurality of virtual voice messaging servers. In a system having accounts, the account information (e.g., the profile) comprises a small amount of data that, in one embodiment, can be duplicated across a number of servers such that any one of those servers may handle a call recipient device's voice message. Consequently, system expansion through adding additional servers is seamless and, because of the simplicity, such a system provides a high degree of system level reliability. As explained further below, the mobile switch 202 configures an idle server to be an available virtual messaging server for notifying call recipients of voice messages. Such reliability is achieved at a low cost because virtual messaging servers are inherently redundant—any server can be used to handle a call for a failed server. Thus, simply having N+1 servers available for message handling (where N is an integer representing the number of servers needed to handle typical message volume) provides high availability to call recipient devices (i.e., subscribers).

At step 626, the method 600 decides what type of notification is to be used with respect to the call recipient. If the recipient has an account, the recipient's profile defines the notification type, which could be SMS with a message link number, MMS, email or sending of a URL pointing back to a stored audio file. If the recipient has not defined a notification type or the recipient is accountless or the system is configured to be accountless, the type of notification to use is defined as a configuration parameter of the system.

If the query at step 626 selects MMS as the notification type, the method 600 proceeds to step 608. At step 608, the method 600 opens a message record. At step 610, the voice message is digitally recorded and temporarily held in memory. At step 612, the method 600 prepares an MMS message containing the caller's telephone number and the voicemail message. The MMS message is directed to the called telephone number. At step 614, the method 600 sends the MMS message to the called telephone number via the MMSC. At step 616, the voice message record is deleted. As such, the virtual messaging system does not retain a copy of the message thus saving substantial storage requirements. The method 600 ends at step 642.

If the query in step 626 defines the notification type to be via SMS, the method 600 proceeds to step 628 to open a message record. At step 630, the voice message is recorded and at step 632 the message is temporarily stored in memory. At step 634, the method 600 assigns a unique message link number as part of the call information within the record. At step 634, the method 600 prepares a notification message using an SMS message. The SMS message is directed to the call recipient device and comprises the message link number and the caller device telephone number. If the caller device can be identified via a caller identification service, the SMS message may contain the caller ID as well. At step 636, the method 600 sends the notification using a SMS protocol. The method ends at step 642. The description with respect to FIG. 7 below describes the method used by a call recipient to retrieve and listen to the voice message identified in the SMS message. As an alternative, the system may be configured to create a unique URL for the specific message with the URL included in an SMS message to the call recipient device. The call recipient can then copy that URL into a standard web browser, which plays the message.

If, at step 626, some other form of notification is defined in the recipient's profile such as e-mail or the use of a service such as translation to text, the method 600 proceeds to step 644 to open a message record. At step 646, the message is recorded and at step 648 the message is temporarily stored in memory. At step 650, the method queries whether other services should be performed. For example, depending on the notification protocol to be used, the notification may require a message link number. In other embodiments, the message, such as a voice and/or video message, may be translated into a text. In other embodiments, caller ID services may be used. If such services are to be used, the method proceeds to step 652 to perform the service and, at step 654, updates the record.

At step 656, the method 600 prepares a notification message using a message protocol defined in the recipient's profile. This notification may be in addition to sending an MMS or SMS so that additional devices (e.g., email) are notified. This form of notification may also be used to send notification to a recipient device other than the call recipient device. At step 658, the method 600 sends the notification using the defined protocol. The method ends at step 642.

Figure 7:
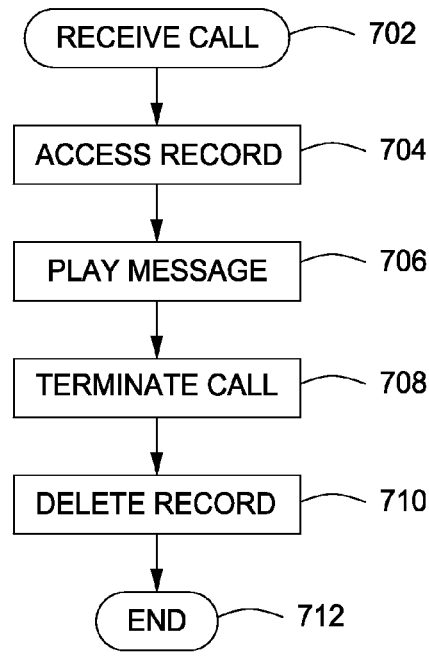
FIG. 7 depicts a flow diagram of a method of providing access to a message within a virtual messaging system in accordance with one embodiment of the invention.

FIG. 7 depicts a flow diagram of a method 700 of providing access to a message within a virtual messaging system in accordance with one embodiment of the invention. The method 700 begins at step 702 upon receiving a call to a specific message link number. In response to the message link number being received, the method 700 accesses the voice message record that corresponds to the message link number. At step 706, the message is played. In one embodiment, at step 708, the call is terminated upon completion of the playback of the voice message. In another embodiment, the recorded message is replayed until the caller terminates the call. At step 710, the method 700 may delete the voice message record. In alternative embodiments, the recorded message is stored for a period of time (e.g., one week, one month, etc.) to facilitate repeated access.

Figure 8:
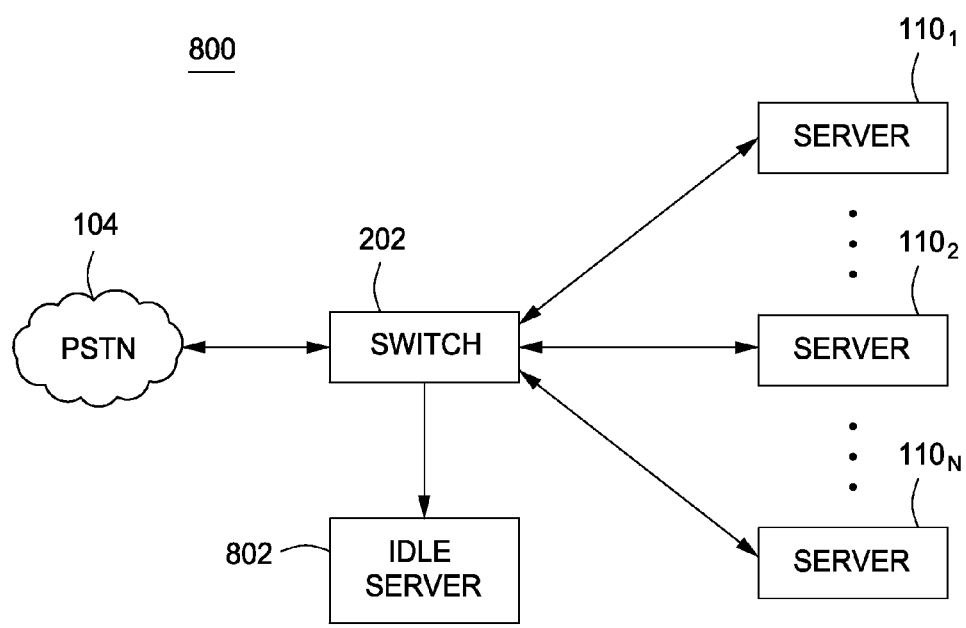
FIG. 8 depicts a functional block diagram of a system for providing virtual messaging in accordance with one embodiment of the invention.

FIG. 8 depicts a functional block diagram of a virtual messaging system 800 having a plurality of virtual messaging servers 110 in accordance with one embodiment of the invention. The system 800 further includes a switch 202 and an idle server 802. The idle server 802 is a virtual messaging server that is not configured to receive incoming calls and notify call recipients. As shown below, the idle server 804 is added to the plurality of servers 110 based on status information.

Upon receiving the incoming call, the switch 202 routes the incoming call to any of the servers 110. Since each virtual messaging server 110 operates independently, any one of the plurality of virtual messaging servers 110 may handle the incoming call. In some embodiments, the incoming call is directed to the server 110 having a highest available capacity as described further below.

Because the virtual messaging system 800 is accountless, in some embodiments, account information is not stored at any of the servers 110. In other embodiments, the account information is duplicated across all of the servers 110. Accordingly, if the call recipient has custom settings, such as a personalized greeting, the call origination device plays the personalized greeting regardless of which messaging server handles the incoming call.

Figure 9:
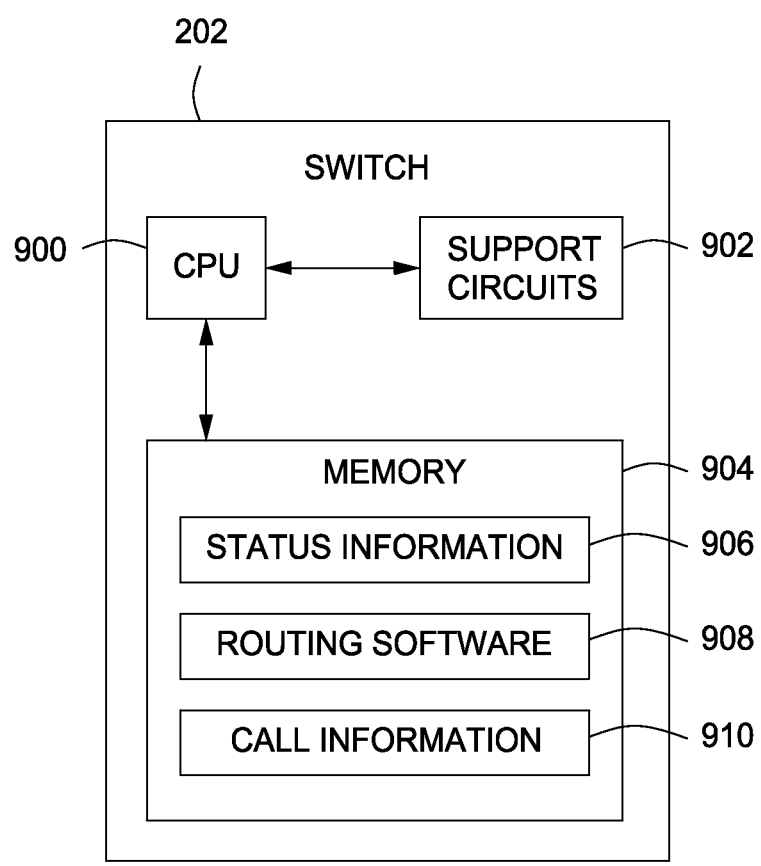
FIG. 9 depicts a simplified block diagram of a system having a plurality of virtual messaging servers in accordance with one embodiment of the invention.

FIG. 9 depicts a simplified block diagram of the switch 202 for routing calls to a plurality of virtual messaging servers that are utilized in the virtual messaging systems of FIGS. 2 and 4 in accordance with one embodiment of the invention. Hereinafter, the virtual messaging server is referred to as "server".

According to one or more embodiments, the switch 202 includes a CPU 900, various support circuits 902 and memory 904. The memory 904 further includes various data, such as status information 906, and software packages, such as routing software 908. The status information 906 includes utilization statistics associated with the handling of incoming calls at the plurality of servers 110. The status information 906 indicates a message volume throughout the plurality of servers. The status information 906 also includes available capacities at each server in terms of the hardware. For example, the status information 906 may include an amount of available memory and/or available processing power (i.e., CPU cycles).

The routing software 908 includes processor-executable instructions that are stored in the memory 904 and executed by the CPU 900 in order to route incoming calls to the plurality of servers. In some embodiments, the routing software 908 selects a server having a highest available capacity amongst the plurality of servers. If none of the plurality of servers 110 have enough resources to handle the incoming call, the routing software 908 configures an idle server to be an available server for handling the incoming call and storing a voice message associated with the incoming call. At this moment, the routing software 908 directs the incoming call to the available server.

Figure 10:
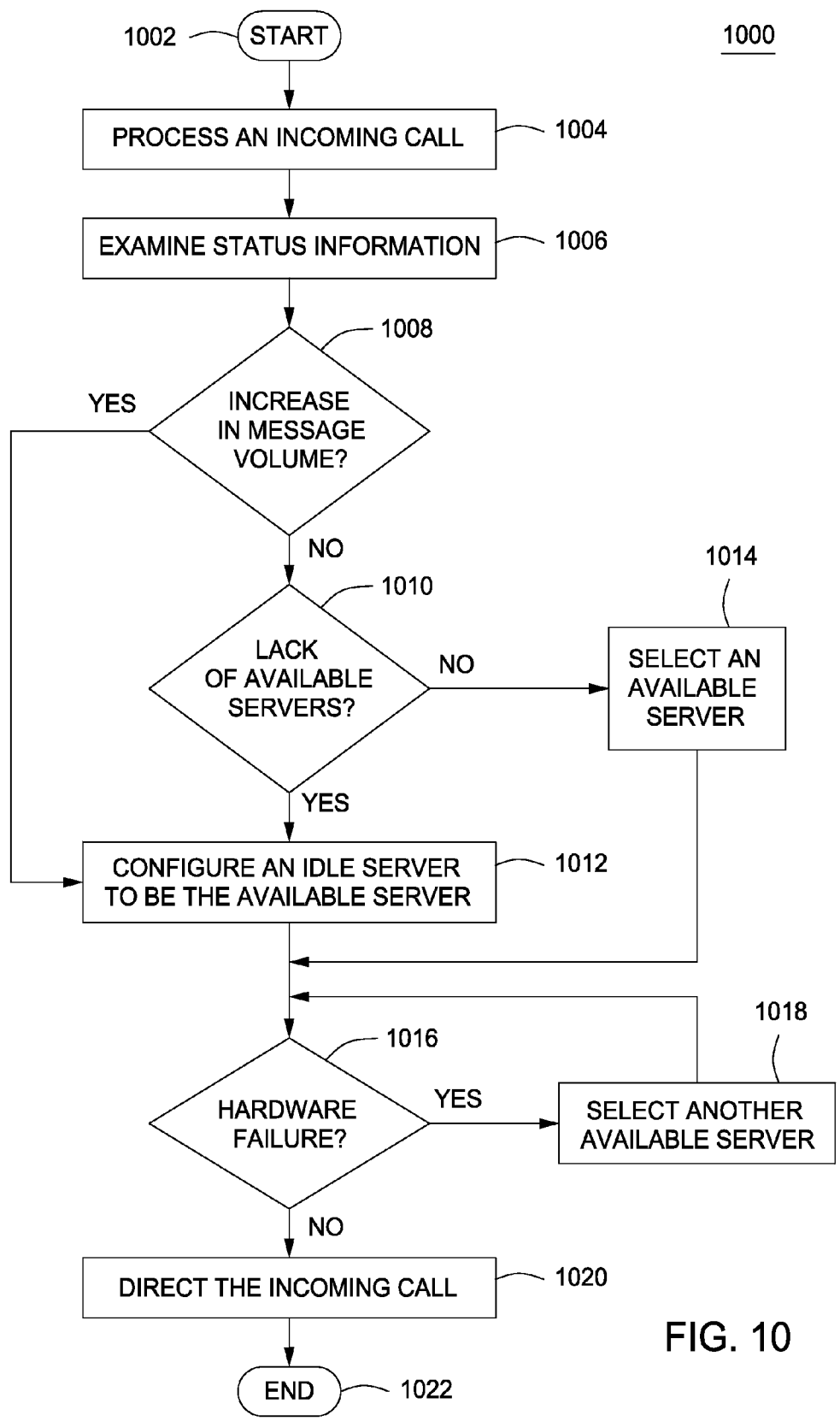
FIG. 10 depicts a flow diagram of a method of routing voice messages to a virtual messaging server of a plurality of virtual messaging servers in accordance with one embodiment of the invention.

FIG. 10 depicts a flow diagram of a method 1000 of routing incoming calls to a virtual messaging server of a plurality of virtual messaging servers in accordance with one embodiment of the invention. The method 1000 starts at step 1002 and proceeds to step 1004.

At step 1004, the method 1000 processes an incoming call. A call origination device initiates the incoming call to one or more call recipients. Subsequently, a mobile switch (e.g., the mobile switch 202 of FIG. 2) routes the incoming call to an available virtual messaging server. If, for example, the incoming call is not answered by the one or more call recipients, a message for the incoming call is stored at the available virtual messaging server.

At step 1006, the method 1000 examines status information. As mentioned above in the descriptions for FIGS. 8 and 9, the status information includes various utilization statistics for each of the plurality of virtual messaging servers. In some embodiments, the status information indicates message volume changes at the plurality of virtual messaging servers over time. For example, the status information may indicate an increase or a decrease in the message volume (i.e., a number of connected calls) during a current time period. In some embodiments, the status information indicates a lack of available virtual messaging servers. For example, each and every one of the plurality of virtual messaging servers may be at full capacity with respect to one or more resources (e.g., memory space, network bandwidth, processing power and/or the like). The message volume, in some instances, at these virtual messaging servers may exceed the available memory space.

At step 1008, a determination is made as to whether there is an increase in the message volume at the plurality of virtual messaging servers. If the method 1000 determines that the message volume increased, the method 1000 proceeds to step 1012. If, on the other hand, the method 1000 determines that the message volume did not increase or that the increase was trivial, the method 1000 proceeds to step 1010. In some embodiments, the message volume increase necessitates additional available virtual messaging servers for handling messages for incoming calls and notifying the one or more call recipients using one or more messaging protocols, such as SMS, MMS and/or email. At step 1012, the method 1000 configures one or more idle servers to be available virtual messaging servers and then, adds these servers to the plurality of virtual messaging servers.

At step 1010, a determination is made as to whether there is a lack of available virtual messaging servers. If the method 1000 determines that none of the plurality of virtual messaging servers are available, the method 1000 proceeds to step 1012. At step 1012, one or more idle servers are configured to be available virtual messaging servers. If, on the other hand, the method 1000 determines that there are one or more available virtual messaging servers amongst the plurality of virtual messaging servers, the method 1000 proceeds to step 1014. If, for instance, none of the plurality of virtual messaging servers includes a sufficient amount of memory to store another message record, then additional virtual messaging servers are added to the plurality of virtual messaging servers. The one or more idle servers now form a portion of the plurality of virtual messaging servers.

At step 1014, the method 1000 selects an available virtual messaging server. In some embodiments, the status information indicates an available capacity for each virtual messaging server. The available capacity may be expressed in terms of one or more resources (e.g., available channels). In some embodiments, the method 1000 selects the virtual messaging server having a highest available capacity amongst the plurality of virtual messaging servers.

At step 1016, a determination is made as to whether a hardware failure occurred that affects communications with the available virtual messaging server. If the method 1000 determines that such a hardware failure occurred, the method 1000 proceeds to step 1018. If, on the other hand, the method 1000 determines that such a hardware failure did not occur, the method 1000 proceeds to step 1020. At step 1018, the method 1000 selects another available virtual messaging server. After step 1018, the method 1000 returns to step 1016 where the method 1000 determines whether the hardware failure affected communications with the other available virtual messaging server. Steps 1016 and 1018 are repeated until an available virtual messaging server is identified whose network connection is unaffected by the hardware failure. Once the method 1000 identifies such a virtual messaging server, the method 1000 proceeds to step 1020. At step 1020, the incoming call is directed to the selected available virtual messaging server. At step 1022, the method 1000 ends.

In some embodiments, the status information indicates availability of one or more virtual messaging servers. An available virtual messaging server is selected to handle the message for the incoming call.

Embodiments of the present invention facilitated easy scalability of the virtual messaging system by adding additional virtual messaging servers to handle additional calls. This scalability facilitates simple call routing such that incoming accountless and boxless calls can simply be routed to any server that is not busy. Furthermore, if the memory of the server becomes full, the system can hunt for the next available server to handle the call.

In other embodiments of the invention, voice and/or video messages may be transcribed into text messages and sent via SMS or e-mail. These messages can also be forwarded via wireline or VoIP carriers to call recipients.

Advertising messages can be applied to delivered voicemails, and carrier branded announcements can be included in the voicemail messages, for example, to tell the caller that the voice and/or video message will be converted to text and delivered via SMS at a later time.

While the foregoing is directed to embodiments of the present invention, other and further embodiments of the invention may be devised without departing from the basic scope thereof.

The invention claimed is:

1. A method of providing boxless virtual messaging, comprising:
   processing an incoming call for at least one call recipient;
   examining status information associated with a plurality of servers for notifying call recipients of voice messages using at least one messaging protocol, wherein each of the plurality of servers operates independently;
   identifying an available server of the plurality of servers, based on the status information, for boxless handling of a voice message for the incoming call; and
   directing the incoming call to the available server, wherein the available server stores the voice message until communication of the voice message to at least one call recipient, wherein the available server communicates at least one notification message associated with the voice message to at least one telephone number of the at least one call recipient, wherein the at least one notification message comprises a telephone number associated with the call origination device and a unique message link number assigned to identify the voice message and for communicating with the available server, wherein the available server uses the unique message link number and the telephone number of the call recipient to identify the voice message upon retrieval by the at least one call recipient dialing the unique message link number and, wherein the available server translates at least a portion of the voice message into a text message that is communicated to the at least one call recipient.

2. The method of claim 1 further comprising duplicating account information for the at least one call recipient amongst the plurality of servers.

3. The method of claim 1 further comprising in response to at least one of a lack of available servers or a voice message volume increase, configuring an idle server to be the available server for notifying the at least one call recipient of the voice message associated with incoming call.

4. The method of claim 1, wherein the available server communicates the voice message to the at least one telephone number of the at least one call recipient upon dialing the unique message link number by the at least one call recipient.

5. The method of claim 1 further comprising in response to a hardware failure affecting communications with the available server, selecting another available server amongst the plurality of servers.

6. The method of claim 1, wherein the available server deletes the message and call information after playing the voice message for the at least one call recipient.

7. The method of claim 1, wherein identifying the available server further comprises selecting the available server having a highest available capacity for handling the voice message amongst the plurality of servers.

8. The method of claim 1, wherein the available server sends a Uniform Resource Locator (URL) via the messaging protocol to facilitate retrieval of the voice message.

9. The method of claim 1, further comprising defining a type of notification message based on a recipient account, that is selected from at least one of: SMS, MMS, email, or a URL.

10. A system for providing virtual messaging, comprising:
a plurality of servers for notifying a plurality of call recipients of a plurality of voice messages using at least one messaging protocol, wherein each server operates independently and comprises:
boxless virtual messaging software for creating voice message records for the plurality of voice messages and deleting the voice message records and the plurality of voice messages after communicating the plurality of voice messages to the call recipients and communicating a plurality of notification messages associated with the plurality of voice messages to a plurality of telephone numbers of the plurality of recipients, wherein each notification message comprises a telephone number associated with the call origination device and a unique message link number for communicating with the available server, wherein the available server uses the unique message link number and each telephone number of each call recipient to identify each voice message upon retrieval by each of the plurality of recipients dialing the unique message link number and wherein the available server translates at least a portion of the voice message into a text message that is communicated to the at least one call recipient.

11. The system of claim 10, wherein the virtual messaging software assigns message link numbers to the plurality of messages, wherein the message link numbers are communicated to the call recipients.

12. The system of claim 10, wherein the boxless virtual voice messaging software deletes each message after playing each voice message to the corresponding call recipient.

13. The system of claim 10, wherein at least one server is added to the plurality of servers based on the status information and receives at least a portion of the plurality of voice messages.

14. The system of claim 13, wherein the status information indicates at least one of a voice message volume increase or a lack of available servers amongst the plurality of available servers.

15. The system of claim 10 further comprising a switch, comprising:
routing software for notifying the plurality of call recipients of the plurality of voice messages using at least one messaging protocol, wherein the plurality of servers are independent of a mobile subscriber service, wherein the routing software selects at least one server of the plurality of servers based on status information, wherein the status information indicates an available capacity for each of the plurality of servers and communicates the plurality of voice messages to at least one server.

16. The system of claim 15, wherein the routing software configures an idle server to receive at least a portion of the plurality of voice messages in response to at least one of: a voice message volume increase or a lack of available servers amongst the plurality of servers.

17. The system of claim 16, wherein for each incoming call, the routing software selects a server having a highest available capacity amongst the plurality of servers.

18. The system of claim 17, wherein the routing software selects another server of the at least one server in response to a hardware failure affecting communications with the selected server.

19. A non-transitory computer readable storage medium comprising one or more processor executable instructions that, when executed by at least one processor, causes the at least one processor to perform a method comprising:
processing an incoming call for at least one call recipient;
examining status information associated with a plurality of servers for notifying call recipients of voice messages using at least one messaging protocol, wherein each of the plurality of servers operates independently;
identifying an available server of the plurality of servers, based on the status information, for boxless handling of a voice message for the incoming call; and
directing the incoming call to the available server, wherein the available server stores the voice message until communication of the voice message to at least one call recipient, wherein the available server communicates at least one notification message associated with the voice message to at least one telephone number of the at least one call recipient, wherein the at least one notification message comprises a telephone number associated with the call origination device and a unique message link number assigned to identify the voice message and for communicating with the available server, wherein the available server uses the unique message link number and the telephone number of the call recipient to identify the voice message upon retrieval by the at least one call recipient dialing the unique message link number and, wherein the available server translates at least a portion of the voice message into a text message that is communicated to the at least one call recipient.

20. A method of providing boxless virtual video messaging, comprising:
processing an incoming video call for at least one video call recipient;
examining status information associated with a plurality of servers for notifying video call recipients of video messages using at least one messaging protocol, wherein each of the plurality of servers operates independently;
identifying an available server of the plurality of servers, based on the status information, for boxless handling of a video message for the incoming video call; and
directing the incoming video call to the available server, wherein the available server stores the video message until communication of the video message to at least one video call recipient, wherein the available server communicates at least one notification message associated with the video message to at least one telephone number of the at least one video call recipient, wherein the at least one notification message comprises a telephone number associated with the video call origination device and a unique message link number assigned to identify the video message and for communicating with the available server, wherein the available server uses the unique message link number and the telephone number of the video call recipient to identify the video message upon retrieval by the at least one video call recipient dialing the unique message link number and, wherein the available server translates at least a portion of the video message into a text message that is communicated to the at least one video call recipient.

* * * * *